(12) United States Patent
Winters

(10) Patent No.: US 6,466,960 B1
(45) Date of Patent: Oct. 15, 2002

(54) METHOD AND APPARATUS FOR PERFORMING A SUM-AND-COMPARE OPERATION

(75) Inventor: Kel D Winters, Fort Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/311,516

(22) Filed: May 13, 1999

(51) Int. Cl.[7] ................................................ G06F 7/50

(52) U.S. Cl. ..................... 708/671; 708/704; 340/146.2

(58) Field of Search .................... 708/671, 706, 708/708, 704; 340/146.2

(56) References Cited

U.S. PATENT DOCUMENTS 5,923,579 A * 7/1999 Widigen et al. ............ 708/706

OTHER PUBLICATIONS

Parhami, B. "Coments on Evaluation of A+B=K Conditions without Carry Propagation", IEEE Trans. on Computers, vol. 43, No. 4, Apr. 1994, p. 381.*

* cited by examiner

Primary Examiner—Tan V. Mai

(57) ABSTRACT

A method and apparatus are provided for performing a fast sum-and-compare operation. The apparatus of the present invention utilizes a single carry save adder in conjunction with a zero detect circuit for performing logic operations to determine whether or not the sum of a plurality of operands is equal to one or more constants. The Carry Save Adder generates a sum, M, and carry, L, that are output from the carry save adder to the zero detect circuit. The zero detect circuit produces internal carry signals that are passed between adjacent bit-cells of the zero detect circuit. The zero detect circuit generates outputs Zk1 through Zkn which are true if the condition A+B+C={k1, k2, k3 . . . kn} for all constants k1 through kn. The carry signals propagate through only one bit of the zero detect circuit, thereby providing the sum-and-compare circuit of the present invention with extremely high speed. The constants are programmed into the metal mask of the zero detect circuit, thereby allowing a single circuit design to be used for multiple values of the constant k.

12 Claims, 5 Drawing Sheets

METHOD AND APPARATUS FOR PERFORMING A SUM-AND-COMPARE OPERATION

TECHNICAL FIELD OF THE INVENTION

The present invention generally relates to a method and apparatus for performing a sum-and-compare operation and, more particularly, to a high-speed sum-and-compare circuit which reduces delay caused by carry propagation and which can be implemented in a relatively small amount of die area.

BACKGROUND OF THE INVENTION

Rapid detection and prediction of arithmetic overflow and underflow exceptions are crucial to the performance of advanced microprocessors. These operations typically require a comparison of a single operand, A, with a constant, k, such as by the comparison operation A=k. These operations more frequently involve comparing the sum of more than one operand (e.g., A+B+C) with one or more constants (e.g., k1, k2), such as by the sum-and-compare operation A+B+C={k1, k2, k3 . . . , kn}. The speed of this sum-and-compare operation depends on the speed of the carry bit propagation through an n-bit addition, where n is the number of bits of each operand.

The traditional approach employs two four-input sum and compare logic blocks to detect the condition A+B+C={k1, k2, k3 . . . , kn}. The two blocks are configured with logic to perform the respective functions A+B+C<kn and A+B+C>k1, where {k1, k2, k3 . . . , Kn} are contiguous ascending integers. Each sum and compare block is implemented with a four-input adder. For example, the operation A+B+C>k1 is performed as an overflow operation (A+B+C−(k1+1)).

In order to enhance performance, it is known to implement the four-input adder with two three-input Carry Save Adders (CSAs) and a single Carry Propagate Adder (CPA). Each CSA is an m-bit full adder circuit with three input addends (i.e., A, B and C) and two outputs, namely, a sum and a carry. The CSAs are cascaded such that the output (i.e., sum and carry) of the first CSA is the input to the second CSA. The second CSA also receives as its input −(k1+1). The CPA is an m-bit full adder circuit, which propagates its carry bits internally. The CPA receives as its input the carry and sum outputs from the second CSA. Only the most significant carry output of the CPA, which represents the overflow bit of the CPA, needs to be evaluated to determine the result of the sum-and-compare operation.

This latter approach has some disadvantages in terms of the amount of die area needed for implementation of the circuit and in terms of performance. Only the first CSA block may be shared by both of the compare functions, A+B+C<kn and A+B+C>k1. Thus, a total of three CSA blocks and two CPA blocks are needed to realize the function A+B+C={k1, k2, k3 . . . , Kn}, which increases the amount of die area needed to implement the logic. The performance of this circuit is limited by the speed of the n-bit carry propagate operations in the CPA block.

An article entitled "Evaluating 'A+B=K' Conditions in Constant Time," in PROCEEDINGS, IEEE INTERNATIONAL SYMPOSIUM ON CIRCUITS AND SYSTEMS, Vol. 1, 1988, pp. 243–6, by Cortadella and Llaberia, proposes a scheme for evaluating a two-input sum and compare operation, A+B=K, without carry propagation. A proposal was made to simplify this scheme in an article entitled "Early Zero Detection," in PROCEEDINGS, 1996 INTERNATIONAL CONFERENCE ON COMPUTER DESIGN, 1996. Both of these articles state that the carry output of a single-bit adder may be expressed independent of the carry input, by Lutz and Jayasimha, if the sum output is known as follows:

If S=K, then Cout=NOT(K)P OR G, (Equation 1)

where S is the sum of A+B, Cout is the carry of A+B, P is (A XOR B), G is AB, and K is the known constant bit. A simple proof of this observation follows:

If S=K, then K=P XOR Cin, (Equation 2)

Cin=P XOR K, (Equation 3)

Cout=Pcin OR G, (Equation 4)

Cout=P(P XOR K) OR G, (Equation 5)

Cout=P(NOT(K)P OR NOT(p)k) OR G, (Equation 6)

Cout=NOT(K)P OR G, (Equation 7)

The customary sum equation:

S=A XOR B XOR Cin, (Equation 8)

is used to detect equality. It will equal zero if A+B=K.

Although the above-noted articles make a very important observation, neither of these articles nor any of the aforementioned techniques teach disclose or propose a solution for simultaneously comparing a sum of operands with multiple constants. Furthermore, none of these articles or any of the aforementioned techniques teach or suggest programming the constant k in a metal mask, which allows a single circuit design to be used for multiple values of k.

Accordingly, a need exists for a sum-and-compare circuit that exploits the observation that the carry output may be expressed independently of the carry input, and which can be implemented in a relatively small amount of die area. A need also exists for a sum-and-compare circuit which is capable of simultaneously comparing a sum with multiple constants, which allows the constants to be programmed in a metal mask, and which exhibits substantial performance improvements over existing sum-and-compare circuits.

SUMMARY OF THE INVENTION

A method and apparatus is provided for performing a fast sum-and-compare operation. The apparatus of the present invention utilizes a single carry save adder in conjunction with a zero detect circuit for performing logic operations to determine whether or not the sum of a plurality of operands is equal to one or more constants. The carry save adder generates a sum, M, and carry, L, that are output from the carry save adder to the zero detect circuit. The zero detect circuit produces internal carry signals that are passed between adjacent bit-cells of the zero detect circuit. The zero detect circuit generates outputs Zk1 through Zkn which are true if the condition A+B+C={k1, k2, k3 . . . kn} for all constants k1 through kn.

The carry signals propagate through only one bit of the zero detector circuit, thereby providing the sum-and-compare circuit of the present invention with extremely high speed. The zero detect circuit performs the logic operations represented by Zk=(L XOR M XOR CIN) XNOR k, where Zk is one of the outputs Zk1 through Zkn, k is one of the constants k1 through kn and CTN is the carry input to the zero detector bit cell. The output Zk will be equal to zero if A+B+C=K. Therefore, if any of the zero detector bit cells encounters a mismatch between the sum and the constant, the output Zk for that particular bit cell will indicate that a mismatch has occurred.

Preferably, the logic of the carry sum adder and of the zero detector is implemented in dynamic domino logic which further increases speed of the sum-and-compare circuit. By utilizing a single Carry Save Adder in conjunction with the zero detector circuit of the present invention, the amount of die area required for implementation of the sum-and-compare circuit is considerably less than known sum-and-compare circuits which utilize multiple Carry Save Adders.

These and other features and advantages of the present invention will become apparent from the following description, drawings and claims.

DETAILED DESCRIPTION OF THE INVENTION

Figure 1:
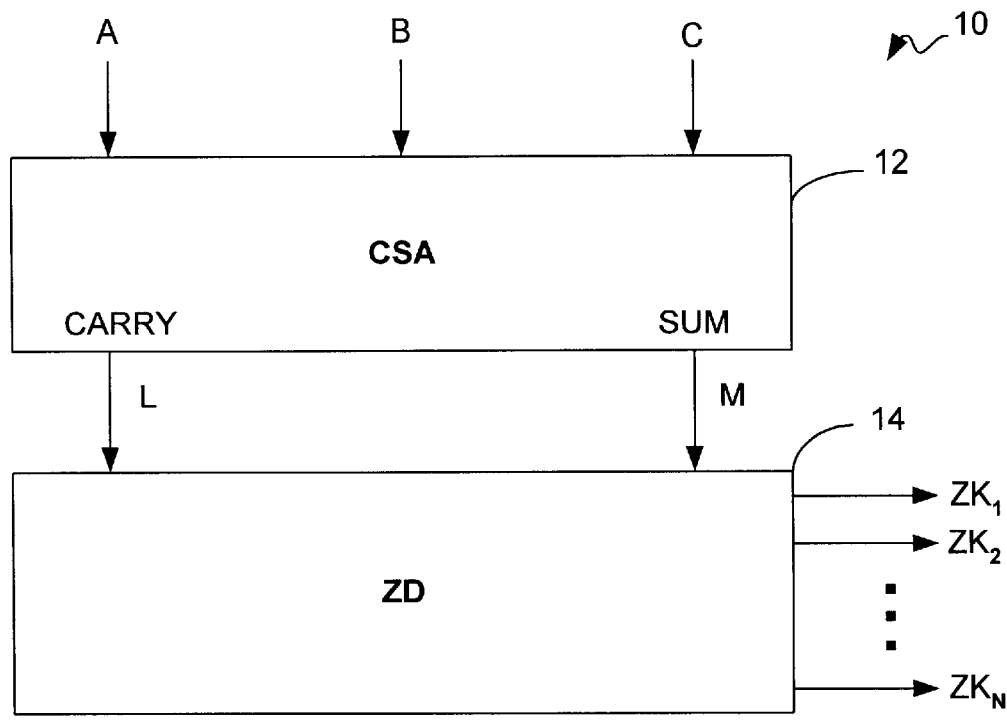
FIG. 1 is a block diagram of the sum-and-compare circuit of the present invention.

The sum-and-compare circuit 10 of the present invention for evaluating $A+B+C=\{k1, k2, k3 \ldots, kn\}$ preferably comprises a single 3-input Carry Save Adder block (CSA) 12, followed by a Zero Detect (ZD) block 14, as shown in FIG. 1. The ZD block 14 has n outputs, Zk1 through Zkn, which are true, i.e., asserted, if the condition $A+B+C=\{k1, k2, k3, \ldots, kn\}$ is met for each the constants k1 through kn, respectively.

Figure 2:
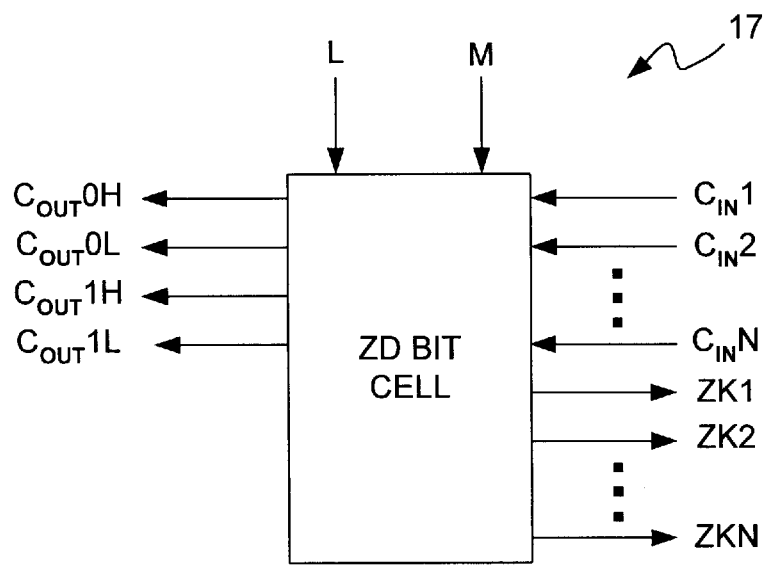
FIG. 2 is a block diagram of a ZD bit cell comprised by the ZD block of FIG. 1.

Like Carry propagate Adders (CPAs), the ZD block 14 has internal carry signals that are passed between adjacent bit-cells. One of the bit cells 17 of the ZD block 14 is shown in block diagram form in FIG. 2. Unlike CPAs, each of the carry outputs, Zk1 through Zkn, of each bit cell 17 is independent of its carry input, Cin1 through CinN, respectively. Therefore, the carry signals propagate through only one bit of the ZD block 14, which provides the sum-and-compare cicuit 10 with a very high speed. The compare constants, k1 through kn, are programmed in the metal mask connections (not shown) of these carry signals, as discussed below in more detail. Each ZD bit cell has two carry output signals, Cout0H and Cout0L, and their complements, Cout1H and Cout1L, respectively.

Each carry input, Cin1 through CinN, of a ZD bit cell i is connected to one of the four carry outputs, Cout0H, Cout0L, Cout1H, Cout1L, of the preceding bit cell, bit cell i−1 (not shown). The carry output of a preceding bit cell, bit cell i−1, to which a carry input of a bit cell is connected is selected in accordance with the following table:

TABLE 1

| $K_j$ | $K_{j-1}$ | Select Carry Output from bit cell i−1: |
|---|---|---|
| 0 | 0 | Cout0H |
| 0 | 1 | Cout1H |
| 1 | 0 | Cout0L |
| 1 | 1 | Cout1L |

Each of the carry inputs (Cin1 through CinN) of a bit cell i is connected to an uncomplemented carry output (Cout0H or Cout1H) of the preceding bit, bit cell i−1, if $k=0$. A carry input (Cin1 through CinN) of bit cell i is connected to the complemented carry output (Cout0L or Cout1L) of the preceding bit cell, bit cell i−1, if $k=1$. The manner in which this is accomplished will be discussed below with respect to FIG. 4B.

The logic equations for the Zero Detect bit-cell 17 are derived as follows:

$$\text{Cout} = \text{NOT(k)P OR G,} \qquad \text{(Equation 9)}$$

where the propagate signal P from the CSA block 12 can be expressed as P=L XOR M and the generate signal G from the CSA block 12 can be expressed as G=LM. Equation 9 can then be expressed as:

$$\text{Cout} = \text{NOT(k)(L XOR M) OR LM,} \qquad \text{(Equation 10)}$$

Equation 10 may be simplified for the cases where $k=0$ and $k=1$ to yield the following four carry output equations:

$$\text{Cout0H} = \text{L OR M,} \qquad \text{(Equation 11)}$$

$$\text{Cout0L} = \text{NOT(L OR M),} \qquad \text{(Equation 12)}$$

$$\text{Cout1H} = \text{LM} \qquad \text{(Equation 13)}$$

$$\text{Cout1L} = \text{NOT(LM),} \qquad \text{(Equation 14)}$$

Figure 4A:
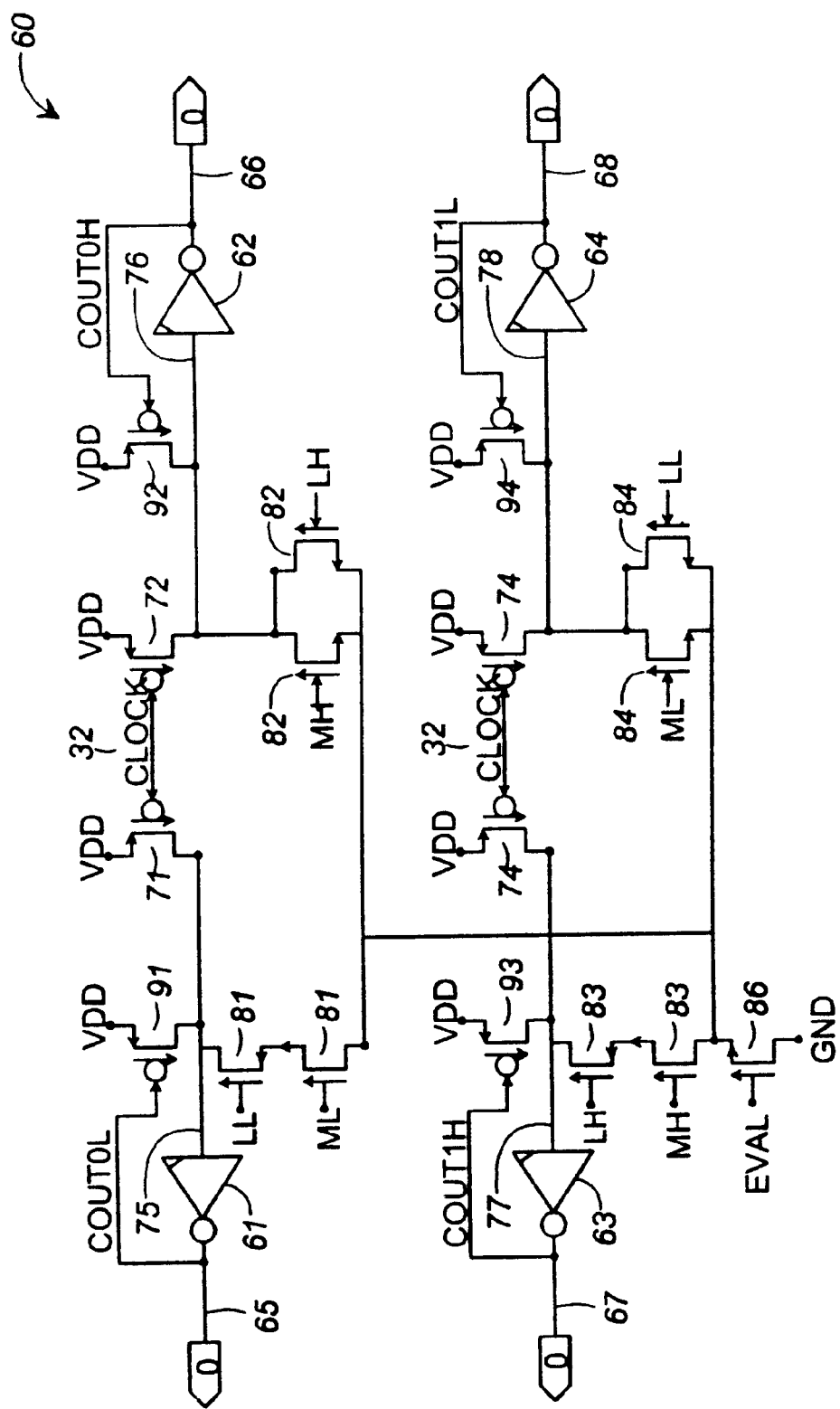
FIGS. 4A and 4B are schematic diagrams of the ZD bit cell shown in FIG. 2.

The portion of the ZD bit cell circuit 17 which performs the logic function represented by Equations 9–14 is shown in the schematic diagram of FIG. 4A, which is discussed below in detail. The outputs Zk1 through Zkn of the ZD bit cell 17 are wire "ORed" for all bits. These outputs indicate whether or not the sum of L, M and CrN match the constant, k by utilizing the following equation:

$$Zk = \text{(L XOR M XOR CIN) XNOR k,} \qquad \text{(Equation 15)}$$

where Zk is one of the outputs Zk1 through ZkN, k is one of the constants k1 through kN and CIN is one of the carry inputs Cin1 through CinN. Equation 15 may be simplified for cases where $k=0$ and $k=1$ to yield the following:

$$Zk = \text{NOT(L XOR M XOR CIN).} \qquad \text{(Equation 16)}$$

CIN is connected to the uncomplemented carry-out of the preceding bit (COUT0H or COUT1H) if $k=0$ and to the complemented carry-out of the preceding bit (COUT0L or COUT IL) if $k=1$.

The portion of the ZD bit cell circuit 17 which performs the logic function represented by Equations 15 and 16 is shown in the schematic diagram of FIG. 4B, which is discussed below in detail.

Figure 3A:
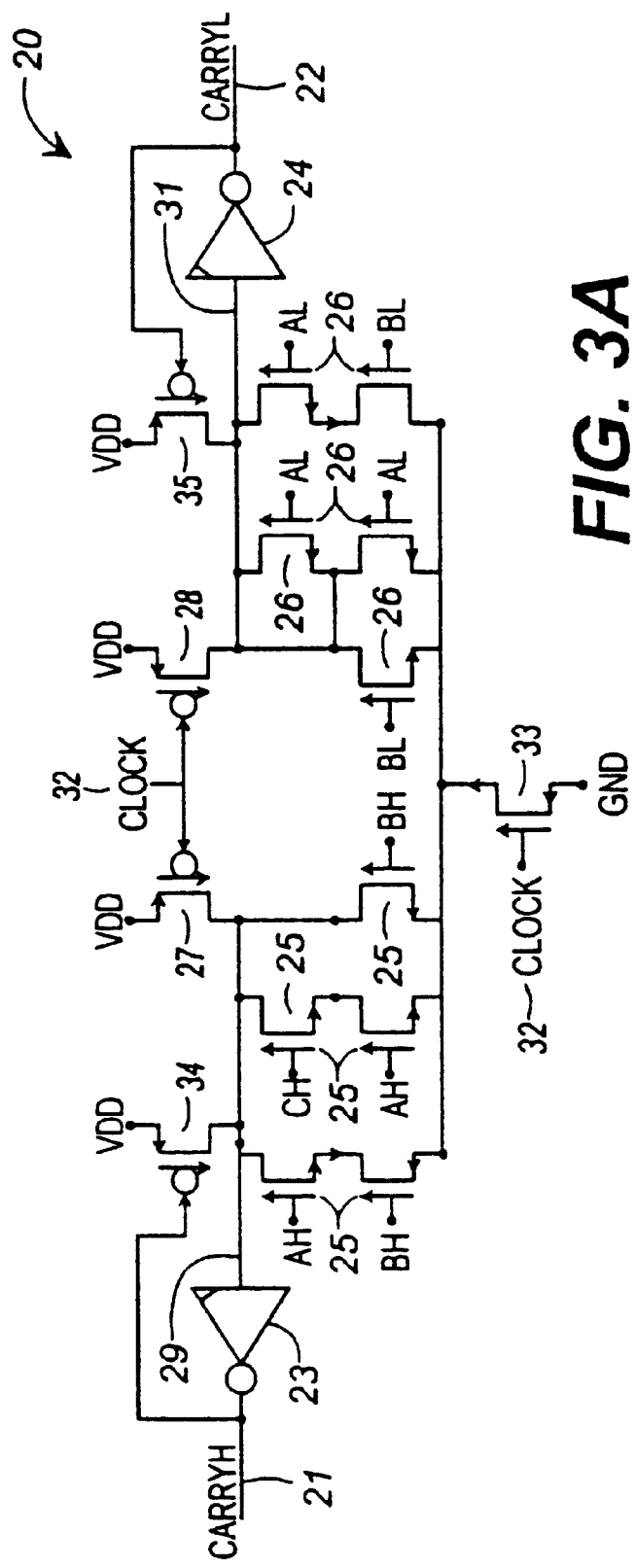
FIGS. 3A and 3B are schematic diagrams of a bit cell comprised by the CSA block of FIG. 1.
Figure 3B:
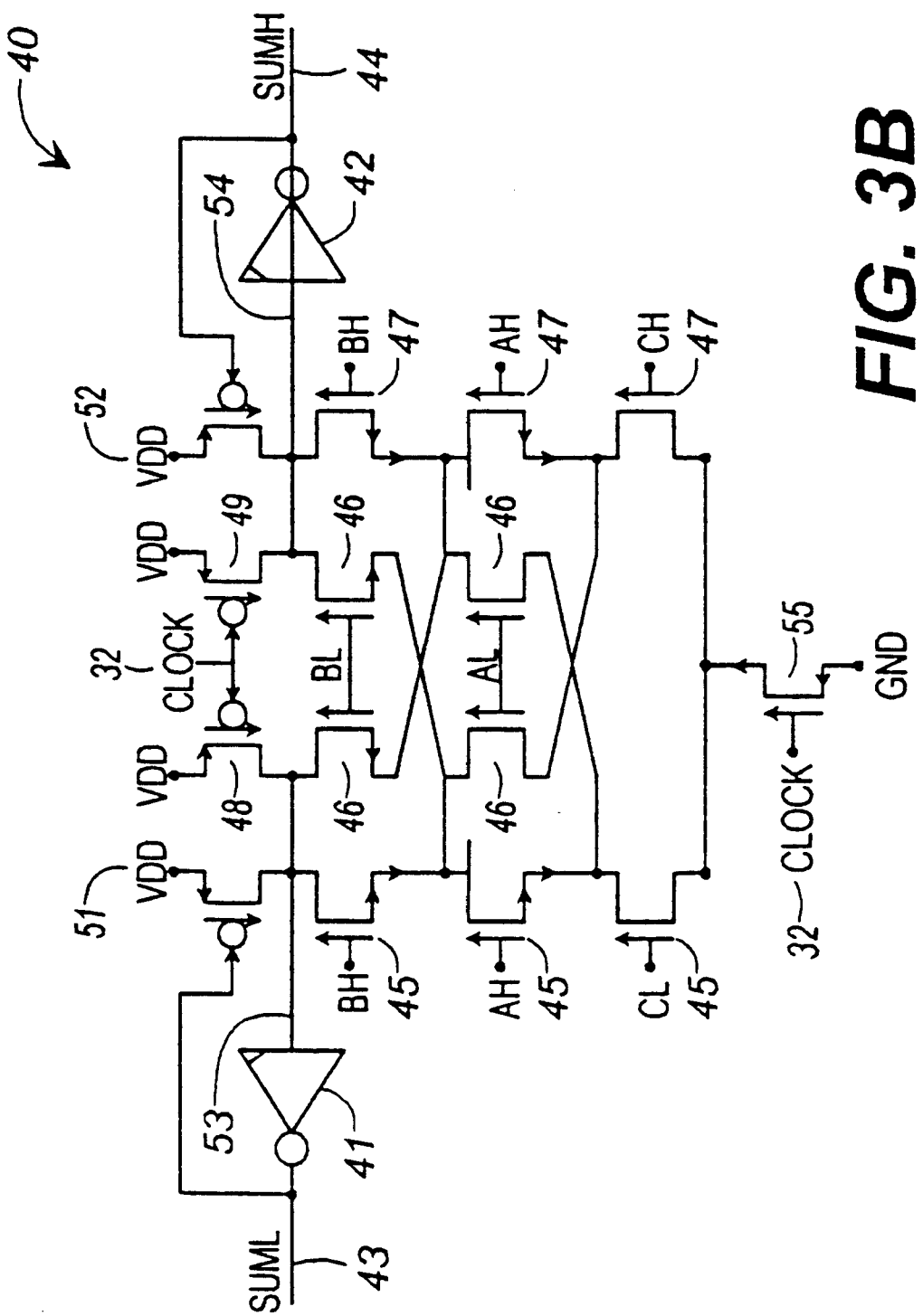

A schematic diagram of one of the bit cells of the CSA block 12 is shown in FIGS. 3A and 3B. As will be understood by those skilled in the art, the number of bit cells comprised by the CSA block 12 and the ZD block 14 is governed by the number of bits comprised by the operands A, B and C. Those skilled in the art will understand that the sum-and-compare circuit 10 is not limited to any particular length, i.e., it is not limited with respect to the number of bits of the operands. Also, the sum-and-compare circuit 10 is not limited with respect to the number of constants with which the sum is compared, as will be understood by those skilled in the art.

The sum-and-compare circuit 10 preferably utilizes dynamic domino logic which is fabricated in accordance with a Complementary Metal Oxide Semiconductor (CMOS) process. Since dynamic domino logic is well known in the art, a detailed discussion of dynamic domino logic will not be provided herein in the interest of brevity. Also, since CMOS fabrication techniques are well known to those skilled in the art, a detailed discussion will not be provided herein of the manner in which the sum-and-compare circuit of the present invention is fabricated using a CMOS fabrication technique. Those skilled in the art will understand that a plurality of CMOS fabrication techniques are currently in use in the industry and that any of these techniques are suitable for use with the present invention.

Each CSA bit-cell of the CSA block 12 preferably has dual-rail, i.e., true and complemented, inputs and outputs for the carry and sum functions. The true and complemented inputs and outputs are suffixed with H and L, respectively, in FIGS. 3A through 4B. All outputs are driven low during the precharge phase, when the clock input is low, and evaluate to a valid state when the clock is high during the evaluation phase.

The portion 20 of the CSA bit-cell that generates the carry outputs is shown in FIG. 3A. The portion 30 of the CSA bit-cell that generates the sum outputs is shown in FIG. 3B. The manner in which the carry outputs are generated by the portion 20 of the CSA bit-cell will now be discussed with reference to FIG. 3A. As stated above, the sum-and-compare circuit 10 of the present invention preferably utilizes dynamic domino logic, which is well know in the art. Dynamic domino logic is implemented utilizing a dynamic precharge logic stage and a static output stage. The carry outputs 21 and 22 of the CSA bit-cell correspond to the carry output, L, of the CSA block 12 shown in FIG. 1. The static output stage of the circuit 20 is comprised of the static inverters 23 and 24, which buffer the output of the circuit 20. The output 21 corresponds to the true carry output and the output 22 corresponds to the complimented carry output.

The precharge stage is comprised of a precharge PFET 27 and a plurality of NFETs 25 which perform the logic functions represented by the customary sum equation, Equation 8, to generate the true carry output 21. Similarly, the circuit 20 comprises a second precharge stage which comprises a precharge PFET 28 and a plurality of NFETs 26 which perform the logic functions represented by Equation 8 to generate the complimented carry output 22.

The precharge PFETs 27 and 28 precharge nodes 29 and 31 during a precharge phase when the clock 32 is low. When the clock 32 is low, the precharge FETs 27 and 28 are turned on and the precharge nodes 29 and 31 are charged high. During the precharge phase, an evaluation FET 33, which connects the precharge stages to ground (GND), is deactivated. When the clock 32 goes high, during the evaluation phase, the evaluation FET 33 is turned on, thereby providing a path from one of the precharge nodes 29 or 31 to ground. During the evaluation phase, either the precharge stage comprising NFETs 25 or the precharge stage comprising NFETs 26 will be pulled down to ground. This will cause the carry output 21 to be high when the carry output 22 is low, and vice versa.

The portion 30 of other CSA bit cell that generates the sum outputs is shown in FIG. 3B. This circuit also preferably is implemented in dynamic domino logic and operates in a manner similar to a manner in which the circuit 20 of FIG. 3A operates. The circuit 40 comprises a static inverter 41 and a static inverter 42 which buffer the outputs 43 and 44, respectively, of the circuit 40. The circuit 40 comprises a first dynamic precharge stage comprised of PFET 48 and NFETs 45 and 46 and a second dynamic precharge stage comprised of PFET 49 and NFETs 46 and 47.

The precharge FET 48 operates in conjunction with the NFETs 45 and 46. The precharge FET 49 operates in conjunction with the precharge stage comprising NFETs 46 and 47. Keeper FETs 51 and 52 maintain the charge that was deposited on precharge nodes 53 and 54, respectively, during the precharge phase. During the evaluation phase, the evaluation NFET 55 is activated thereby providing a path from the precharge nodes 53 and 54 to ground (GND). When the clock signal 32 is low, the precharge FETs 48 and 49 are activated thereby allowing a charge to be deposited on the precharge nodes 53 and 54.

The NFET 55 is inactive during the precharge phase. During the evaluation phase, when the clock 32 is high, the NFET 55 is activated, thereby providing a path from one of the precharge nodes 53 or 54 to ground, depending on the values of the bits being applied to the gates of the NFETs 45, 46 and 47. This causes the outputs 43 and 44 to be either high or low. When the output 43 is high, the output 44 is low, and vice versa. The outputs 43 and 44 correspond to the sum output, M, of the CSA block 12. Of course, the sum output M will be comprised of a plurality of bits which correspond to the outputs of all of the CSA bit cells.

The carry output L and the sum output M are provided to the ZD block 14, as shown in Fig. 1. The carry and sum outputs are utilized by the ZD bit-cells 17. FIGS. 4A and 4B represent one of the ZD bit-cells 17 of the ZD block 14. The manner in which the ZD bit-cells operate will now be described with respect to FIGS. 4A and 4B.

The carry output generation circuit 60 of the ZD bit-cell has dual-rail carry inputs and carry outputs, which are suffixed H and L, respectively. The carry output generation circuit 60 comprises four static output inverters 61, 62, 63 and 64, which buffer the outputs 65, 66, 67 and 68, respectively. The circuit 60 comprises four precharge PFETs 71, 72, 73 and 74, which precharge the precharge nodes 75, 76, 77 and 78, respectively. The circuit 60 comprises four dynamic precharge stages, which comprise the precharge PFETs 71, 72, 73 and 74 and a plurality of NFETs 81, 82, 83 and 84.

The circuit 60 comprises an evaluation FET 86, which provides a path from the precharge nodes 75, 76, 77 and 78 to ground (GND) during the evaluation phase. The circuit 60 comprises four keeper FETs 91, 92, 93 and 94 which maintain the charges that were deposited on the precharge nodes 75, 76, 77 and 78, respectively, during the precharge phase.

When the clock signal 32 is low, during the precharge phase, the precharge nodes 75, 76, 77 and 78 are precharged to VDD as a result of the activation of the precharge FETs 71, 72, 73 and 74. During the evaluation phase, when the clock signal is high, the evaluation FET 86 is activated, thereby providing a path from the precharge nodes to ground (GND). The logic stage comprised of NFETs 81 and PFET 71 performs the logic operations represented by Equation 12 and produces an output 65, which corresponds to Cout0L. The logic stage comprised of NFETs 82 and PFET 72 performs the logical operations represented by Equation 11 to produce the output 66, which corresponds to Cout0H.

The precharge stage comprised of NFETs 83 and PFET 73 performs the logical operations represented by Equation 13 to produce the output 67, which corresponds to Cout1H. The precharge stage comprised of NFETs 84 and PFET 74 performs the logic operations represented by Equation 14 to produce the output 68, which corresponds to Cout1L.

As stated above with respect to Table 1, the carry outputs of the circuit 60 of the ZD bit cell are connected to certain carry inputs of a neighboring ZD bit-cell of the ZD block 14. Therefore, the carry outputs Cout0H, Cout0L, Cout1H and Cout1L are connected to certain carry inputs Cin0H of an adjacent ZD bit cell (not shown). As indicated in Table 1, the values of the constants will govern which carry outputs of one ZD bit cell are connected by programmable metal masks to the carry inputs of the adjacent bit cell, as discussed above in detail.

Figure 4B:
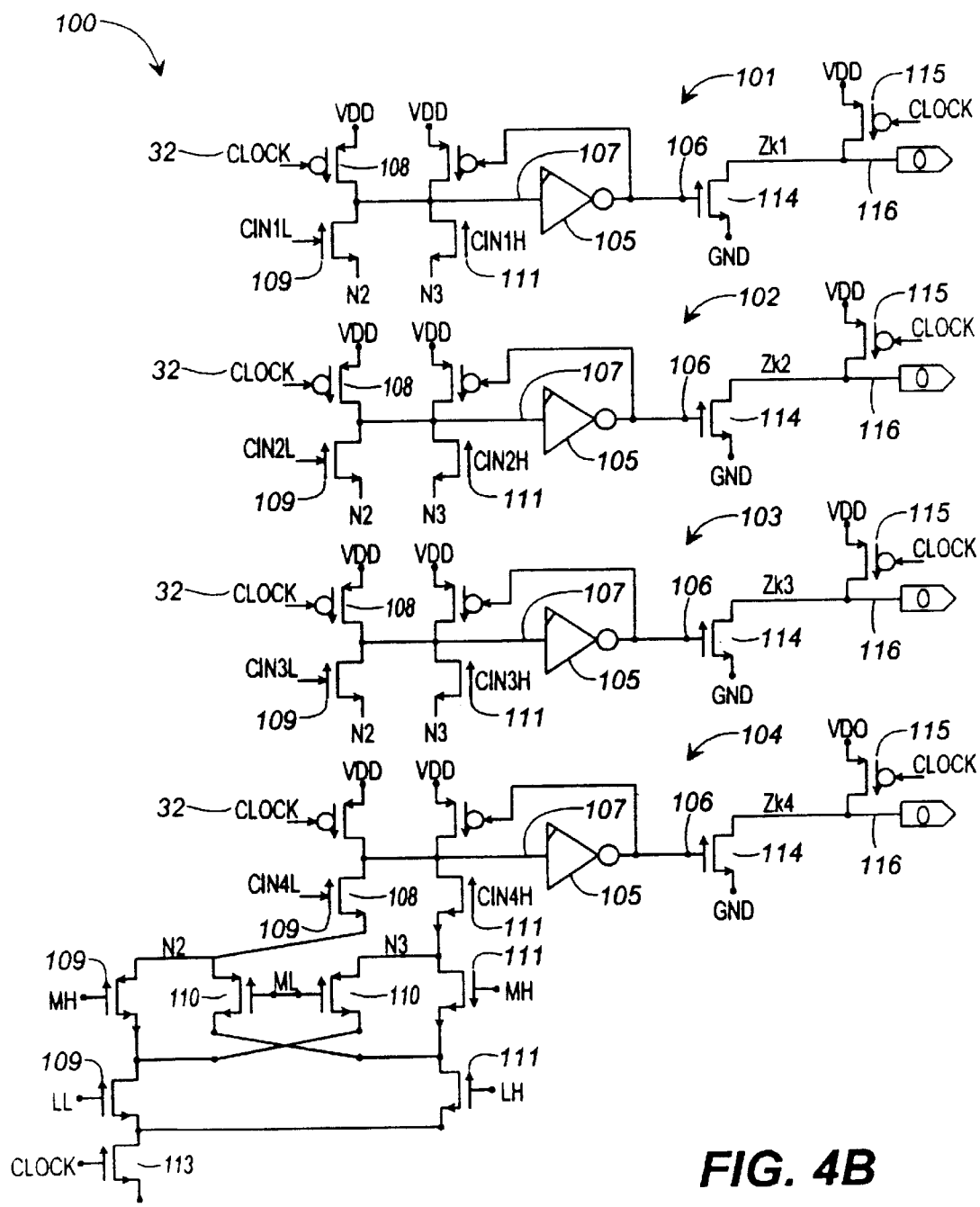

FIG. 4B is a schematic diagram of the circuit 100 of the ZD bit cell 17 that generates the outputs Zk1 through ZkN of the sum-and-compare circuit 10. The circuit 100 comprises an output stage for each of the Zk outputs. In accordance with this example wherein the operands A, B and C are each comprised of four bits, the circuit 100 comprises four output stages 101, 102, 103 and 104. Of course, those skilled in the art will understand that the sum-and-compare circuit 10 is not limited to any particular size or to processing operands of any particular lengths. Each output stage comprises a static output inverter 105, which buffers the output Zk on lines 106. Each output stage comprises a precharge FET 108 which precharges the precharge nodes 107 during the precharge phase when the clock 32 is low.

Each of the output stages of circuit 100 is connected at nodes N2 and N3 to the precharge stage of the circuit 100, which is comprised of NFETs 109, 110 and 111 and precharge PFETs 108. When the clock signal is high, during the evaluation phase, the evaluation FET 113 is activated. Depending on the values of the sum M and carry L signals output from the CSA block 12, the precharge nodes 107 will either be pulled down to ground or will maintain their precharge states. The NFETs 109, 110 and 111 operate together to perform the logic functions represented by Equation 15.

The ZK outputs on lines 106 will be high when the precharge nodes are low, thus causing the NFETs 114 to be activated. Each output stage also comprises a second precharge FET 115 that precharges nodes 116 during the precharge phase when the clock 32 is low.

When the clock signal goes high, during the evaluation phase, the NFETs 114 are activated, thus causing the Zk outputs to be pulled down to ground. Therefore, the outputs ZK1 through Zk4 will be low when the outputs of the static inverters 105 on lines 106 are high. At all other times, the Zk outputs, Zk1 through Zk4, will be high. This is because the Zk outputs are high during the precharge phase and whenever the outputs of the static inverters 105 are low. Therefore, when any one of the Zk outputs are high, this is an indication that a mismatch has occurred between a particular constant and the sum with which it is being compared. Those skilled in the art will understand that the logic could also be configured such that, when any one of the Zk outputs are low, a mismatch has occurred.

The Zk outputs are wire-ORed with respective Zk outputs of other ZD bit cells (not shown). For example, the output Zk4 will be wire-Ored with the Zk4 outputs of all other ZD bit cells. Therefore, whenever a mismatch occurs between any of the Zk4 outputs and a bit of a constant k, the Zk4 output of the ZD block 14 will be high, thus indicating that a mismatch has occurred. This is true for all of the Zk outputs.

Therefore, the sum-and-compare the present invention is capable of being configured to compare one or more constants with a sum. Furthermore, because the sum-and-compare circuit 10 does not require carry propagation, it is extremely fast. The speed of the sum-and-compare circuit is further increased by using the dynamic domino logic, which utilizes stages of NFETs to maximize the pull down speed of the circuit. Also, the sum-and-compare circuit does not require the use of two carry save adders, as does the aforementioned sum-and-compare circuit of the prior art, but rather, utilizes the single carry save adder 12 in conjunction with the zero detect block 14. This allows the amount of die area needed for implementation of the sum-and-compare circuit 10 to be minimized.

It will be understood by those skilled in the art that the present invention has been described with reference to the preferred embodiment, but that the present invention is not limited to this embodiment. Those skilled in the art will understand that modifications may be made to the embodiment discussed above without deviating from the spirit and scope of the present invention. Those skilled in the art will also understand that the present invention is not limited to any particular type of logic for performing its functions. Persons skilled in the art will understand that there are many different ways of implementing logic that is capable of performing the necessary functions.

What is claimed is:

1. An apparatus for performing a sum-and-compare operation, the apparatus generating a sum of a plurality of operands and comparing the sum with a plurality of constants, the apparatus comprising:

a carry save adder, the carry save adder receiving a plurality of operands to be added together, the carry save adder comprising logic configured to add the operands together to thereby generate the sum and a carry, the sum and carry being output from the carry save adder; and a zero detector circuit, the zero detector circuit receiving the sum and carry output from the carry save adder, the zero detector circuit comprising logic configured to process the sum and carry and to compare it to a plurality of constants to thereby determine whether or not the sum is equal to the plurality of constants.

2. The apparatus of claim 1, wherein the carry save adder and the zero detector circuit are implemented in dynamic domino logic.

3. The apparatus of claim 2, wherein the carry save adder further comprises a plurality of bit cells, each bit cell comprising:

a carry-generation circuit that generates the carry and a sum-generation circuit that generates the sum, the carry-generation circuit and the sum-generation circuit comprising logic for performing logic operations represented by an equation, A XOR B XOR C, to produce the sum, M, and the carry, L, where A, B and C are the operands being added together, each operand comprising a plurality of bits, the sum, M, and the carry, L, each comprising a plurality of bits.

4. The apparatus of claim 3, wherein the zero detector circuit comprises a plurality of bit cells, each bit cell comprising logic configured to perform logic operations represented by an equation, Zk=(L XOR M XOR CIN) XNOR k, where Zk is the output of the zero detector circuit, CIN is a carry input from an adjacent bit-cell of the zero detector circuit and k is the constant with which a number represented by the sum M and carry L are being compared, and wherein Zk will be zero if A+B+C=k.

5. The apparatus of claim 4, wherein each carry-generation circuit comprises a first precharge stage which comprises a first precharge P field effect transistor (PFET) and a plurality of N field effect transistors (NFETs), the first precharge PFET having a gate terminal connected to a clock and a source terminal connected to a supply voltage VDD, the drain terminal of the PFET being channel-connected to a first group of the NFETs of the first precharge stage, a second group of NFETs of the first precharge stage being channel connected to an evaluation NFET, the evaluation NFET having a gate terminal connected to the clock, each NFET of the first group of NFETs of the first precharge stage being channel-connected to a respective NFET of the second group of NFETs of the first precharge stage, wherein each NFET has a gate terminal which receives a bit of the operands A, B or C input to the carry save adder, and wherein during an evaluation phase of the clock, a carry having a first polarity is output from the carry-generation circuit.

6. The apparatus of claim 5, wherein each carry-generation circuit comprises a second precharge stage which comprises a second precharge PFET and a plurality NFETs, the second precharge PFET having a gate terminal connected to the clock and a source terminal connected to the supply voltage VDD, the drain terminal of the PFET being channel-connected to third group of the NFETs of the second precharge stage, a fourth group of NFETs of the first precharge stage being channel-connected to the evaluation NFET, each NFET of the third group of NFETs being channel-connected to a respective NFET of the fourth group of NFETs, wherein each NFET of the second precharge stage has a gate terminal which receives a bit of the operands A, B or C input to the carry save adder, and wherein during the evaluation phase of the clock, a carry having a second polarity is output from the carry-generation circuit.

7. The apparatus of claim 6, wherein each sum-generation circuit comprises a first precharge stage which comprises a first precharge PFET and a plurality of NFETs, the first precharge PFET of the sum-generation circuit having a gate terminal connected to the clock and a source terminal connected to the supply voltage VDD, the drain terminal of the PFET of the first precharge stage of the sum-generation circuit being channel-connected to a first group of the NFETs of the sum-generation circuit, a second group of NFETs of the sum-generation circuit being channel-connected to an evaluation NFET, the evaluation NFET of the sum-generation circuit having a gate terminal connected to the clock, each NFET of the first group of NFETs of the sum-generation circuit being channel-connected to a respective NFET of the second group of NFETs of the sum-generation circuit, wherein each NFET of sum-generation circuit has a gate terminal which receives a bit of the operands A, B, or C input to the carry save adder, and wherein during the evaluation phase of the clock, a sum having said first polarity is output from the sum-generation circuit.

8. The apparatus of claim 7, wherein each sum-generation circuit comprises a second precharge stage which comprises a second precharge PFET and a plurality of NFETs, the second precharge PFET of the sum-generation circuit having a gate terminal connected to the clock and a source terminal connected to the supply voltage VDD, the drain terminal of the second PFET of the second precharge stage of the sum-generation circuit being channel-connected to a third group of the NFETs of the sum-generation circuit, a fourth group of NFETs of the second stage of the sum-generation circuit being channel connected to the evaluation NFET, each NFET of the third group of NFETs of the sum-generation circuit being channel-connected to a respective NFET of the fourth group of NFETs of the sum-generation circuit, wherein each NFET of sum-generation circuit has a gate terminal which receives a bit of the operands A, B, or C input to the carry save adder, and wherein during the evaluation phase of the clock, a sum having said second polarity is output from the sum-generation circuit.

9. The apparatus of claim 8, wherein the zero detector circuit comprises a plurality of bit cells, each bit cell comprising a carry-out circuit and a Z output circuit, each carry-out circuit comprising:

a COUT0L stage, the COUT0L stage comprising a first precharge PFET having a gate terminal connected to the clock and first and second NFETs, the first and second NFETs being channel-connected to each other, the first NFET being channel-connected to the first precharge PFET of the COUT0L stage, the second NFET being channel-connected to an evaluation NFET, the COUT0L stage having an output terminal connected to at a node where the first NFET is channel-connected to the first precharge PFET, wherein each of the NFETs of the COUT0L stage has a gate terminal which receives either a bit of the sum signal output from first stage of the sum-generation circuit or a bit of the carry signal output from the second stage of the carry-generation circuit; and a COUT1H stage, the COUT1H stage comprising a second precharge PFET having a gate terminal connected to the clock and third and fourth NFETs, the third and fourth NFETs being channel-connected to each other, the third NFET being channel-connected to the second precharge PFET of the COUT1H stage, the fourth NFET being channel-connected to the evaluation NFET, the COUT1H stage having an output terminal connected to a node where the third NFET is channel-connected to the second precharge PFET, wherein each of the NFETs of the COUT1H stage has a gate terminal which receives either a bit of the sum signal output from second stage of the sum-generation circuit or a bit of the carry signal output from the first stage of the carry-generation circuit, wherein during the evaluation phase of the clock, the COUT0L and the COUT1H carry-out signals are output from the COUT0L output terminal and the COUT1H output terminal, the COUT0L carry-out signal being of the second polarity and the COUT1H carry-out signal being of the first polarity, and wherein these carry-out signals are utilized by an adjacent bit cell of the zero detect circuit as carry inputs to the adjacent bit cell.

10. The apparatus of claim 9, wherein each carry-out circuit further comprises:

a COUT0H stage, the COUT0H stage comprising a third precharge PFET having a gate terminal connected to the clock and fifth and sixth NFETs, the fifth and sixth NFETs being channel-connected to each other, the fifth and sixth NFETs being connected to each other in parallel and being channel-connected to the third precharge PFET of the COUT0H stage, the fifth and sixth NFETs being channel-connected to the evaluation NFET, the COUT0H stage having an output terminal connected to a node where the fifth and sixth NFETs are channel-connected to the third precharge PFET, wherein each of the NFETs of the COUT0H stage has a gate terminal which receives either a bit of the sum signal output from second stage of the sum-generation circuit or a bit of the carry signal output from the first stage of the carry-generation circuit; and a COUT1L stage, the COUT1L stage comprising a fourth precharge PFET having a gate terminal connected to the clock and seventh and eighth NFETs, the seventh and eighth NFETs being channel-connected to each other, the seventh and eighth NFETs being connected to each other in parallel and being channel-connected to the fourth precharge PFET of the COUT1L stage, the seventh and eighth NFETs being channel-connected to the evaluation NFET, the COUT1L stage having an output terminal connected to a node where the seventh and eighth NFETs are channel-connected to the fourth precharge PFET, wherein each of the NFETs of the COUT1L stage has a gate terminal which receives either a bit of the sum signal output from first stage of the sum-generation circuit or a bit of the carry signal output from the second stage of the carry-generation circuit, wherein during the evaluation phase of the clock, the COUT0H and the COUT1L carry-out signals are output from the COUT0H and COUT1L output terminals, respectively, the COUT0H signal being of the first polarity and the COUT1L signal being of the second polarity, and wherein these carry-out signals are utilized in conjunction with the COUT1H and COUT0L signals by an adjacent bit cell of the zero detect circuit as carry inputs to the adjacent bit cell.

11. The apparatus of claim 10, wherein each Z output circuit comprises:

a plurality of precharge stages, each precharge stage having at least one input terminal which receives one of the carry-out signals COUT1H, COUT1L, COUT0H or COUT0L from an adjacent carry-out circuit of an adjacent bit cell of the zero detect circuit, the input terminal corresponding to a gate terminal of an NFET, each precharge stage of the Z output circuit comprising a precharge PFET having a gate terminal connected to the clock, wherein the precharge stages of the Z output circuit share a plurality of NFETs, each of the shared NFETs having a gate terminal which receives a bit of either the sum signal output from the first stage of the sum-generation circuit, the sum signal output from the second stage of the sum-generation circuit, the carry signal output from the first stage of the carry-generation circuit, or the carry signal output from the second stage of the carry-generation circuit; and a Z output stage electrically coupled to a respective precharge stage of the Z output stage, each Z output stage having an output terminal, wherein during the evaluation phase, a Z output signal is output from each of the output terminals of the Z output stages, and wherein assertion of any one of the Z output signals indicates that A+B+C is not equal to a constant k.

12. The apparatus of claim 11, wherein the sum-and-compare operation compares the sum of the operands A, B and C with a plurality of constants k1 through kN, and wherein the constants are programmed into the metal masks of the bit cells of the zero detect circuit, and wherein the values of the constants cause particular carry-out signals from the carry-out circuit of an adjacent bit cell of the zero detect circuit to be applied to particular input terminals of the Z output circuit.

* * * * *